United States Patent
Leach et al.

(10) Patent No.: US 9,555,533 B2
(45) Date of Patent: Jan. 31, 2017

(54) WELDING PLIERS MULTI-TOOL

(71) Applicant: LINCOLN GLOBAL, INC., City of Industry, CA (US)

(72) Inventors: Jason Karl Leach, Cleveland, OH (US); Jamy Edward Bulan, Lakewood, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 378 days.

(21) Appl. No.: 14/081,067

(22) Filed: Nov. 15, 2013

(65) Prior Publication Data
US 2015/0047127 A1 Feb. 19, 2015

Related U.S. Application Data

(60) Provisional application No. 61/866,231, filed on Aug. 15, 2013.

(51) Int. Cl.
*B25F 1/00* (2006.01)
*B25F 1/04* (2006.01)
*B23K 37/00* (2006.01)

(52) U.S. Cl.
CPC ............... *B25F 1/003* (2013.01); *B23K 37/00* (2013.01); *B25F 1/04* (2013.01)

(58) Field of Classification Search
CPC ............. B25F 1/003; B25F 1/04; B23K 37/00
USPC ............................................... 7/128; 81/427.5
See application file for complete search history.

(56) References Cited

U.S. PATENT DOCUMENTS

| | | | |
|---|---|---|---|
| 1,523,808 A | 1/1925 | Kropacz | |
| 1,840,135 A | 1/1932 | Schutt | |
| 2,389,842 A * | 11/1945 | Cummins | G01B 3/00 33/833 |
| 3,315,295 A | 4/1967 | Jeter et al. | |
| 3,858,325 A | 1/1975 | Goerler | |
| 4,595,136 A | 6/1986 | Cooper | |
| 4,667,412 A | 5/1987 | Carlson | |
| 5,142,721 A | 9/1992 | Sessions et al. | |
| 5,146,815 A | 9/1992 | Scott | |

(Continued)

FOREIGN PATENT DOCUMENTS

| WO | 01/30542 A1 | 5/2001 |
|---|---|---|
| WO | 2007/125447 A1 | 11/2007 |

OTHER PUBLICATIONS

"7 Piece Fillet Weld Set", online document available at http://www.newmantools.com/gauge/7piece.htm, Newman Tools, Inc., 2013.

(Continued)

*Primary Examiner* — Monica Carter
*Assistant Examiner* — Danny Hong
(74) *Attorney, Agent, or Firm* — Brad C. Spencer

(57) ABSTRACT

The invention described herein generally relates to a pliers welding multi-tool including welding pliers and a plurality of welding tools that can be stowed in one or both handles of the pliers welding multi-tool. The pliers welding multi-tool handles can include rotating, sliding, or other interfaces to store or take out the pliers or other tools. Other tools integrated in the pliers portion or stored within the handles can include a welding fillet gauge, a welding thickness gauge, a welding tip remover, a welding nozzle remover, a bevel-angle tool, a root gap gauge, a plate and rod gauge, and others.

15 Claims, 11 Drawing Sheets

(56) References Cited

U.S. PATENT DOCUMENTS

| | | | |
|---|---|---|---|
| 5,212,844 A | 5/1993 | Sessions et al. | |
| 5,267,366 A * | 12/1993 | Frazer | B25F 1/04 7/128 |
| D371,498 S | 7/1996 | Lai | |
| 5,611,149 A | 3/1997 | Fujiwara | |
| 5,664,274 A | 9/1997 | Collins | |
| D386,375 S | 11/1997 | Harris | |
| 5,689,886 A | 11/1997 | Yeh | |
| 5,697,114 A | 12/1997 | McIntosh et al. | |
| 5,743,582 A * | 4/1998 | Rivera | B25F 1/003 294/99.2 |
| 5,791,002 A * | 8/1998 | Gardiner | B25F 1/003 7/128 |
| 5,809,599 A * | 9/1998 | Frazer | B25F 1/04 30/153 |
| 5,979,059 A * | 11/1999 | Leatherman | B25F 1/04 30/161 |
| 6,009,582 A | 1/2000 | Harrison et al. | |
| 6,014,787 A * | 1/2000 | Rivera | B25F 1/003 30/152 |
| 6,047,426 A * | 4/2000 | McIntosh | B25F 1/003 30/152 |
| 6,070,504 A * | 6/2000 | Frazer | B25F 1/04 30/255 |
| 6,185,771 B1 | 2/2001 | Trusty, Sr. | |
| D449,768 S | 10/2001 | Salazar et al. | |
| 6,487,941 B1 | 12/2002 | Ping | |
| 6,564,678 B1 | 5/2003 | Wang | |
| 6,578,221 B2 * | 6/2003 | Ping | B25F 1/003 7/128 |
| 6,694,558 B2 * | 2/2004 | Ping | B25F 1/04 7/128 |
| 7,080,423 B2 | 7/2006 | Seber et al. | |
| 7,353,736 B2 * | 4/2008 | Poehlmann | B25F 1/04 30/161 |
| 7,793,570 B2 | 9/2010 | Mattson et al. | |
| 8,001,640 B2 | 8/2011 | Carter | |
| 9,021,641 B2 * | 5/2015 | Leach | B25F 1/04 7/118 |
| 2004/0141313 A1 | 7/2004 | Elsener | |
| 2011/0162149 A1 | 7/2011 | Merten | |

OTHER PUBLICATIONS

"US Forge Welding Tip Cleaner #00802", online document available at http://www.amazon.com/US-Forge-Welding-Cleaner-00802/dp/B000UR0NO, US Forge, 2013.

* cited by examiner

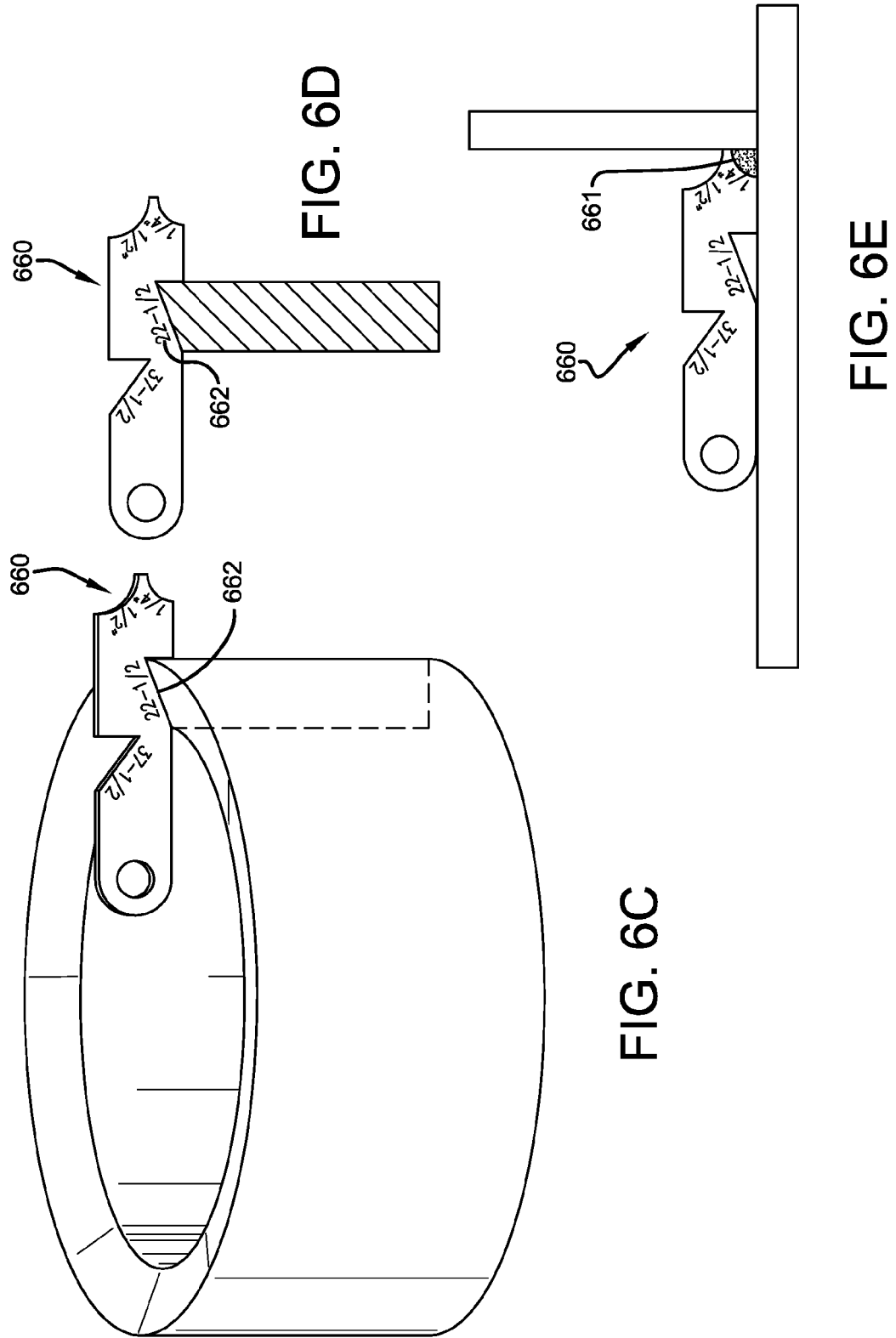

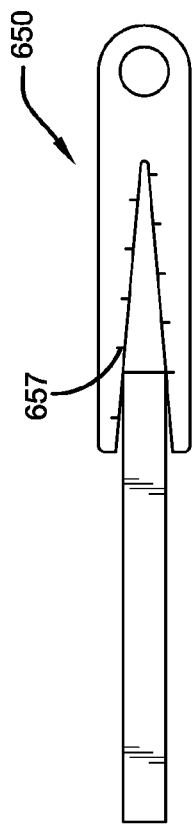
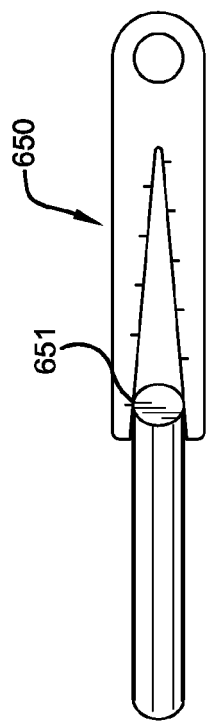
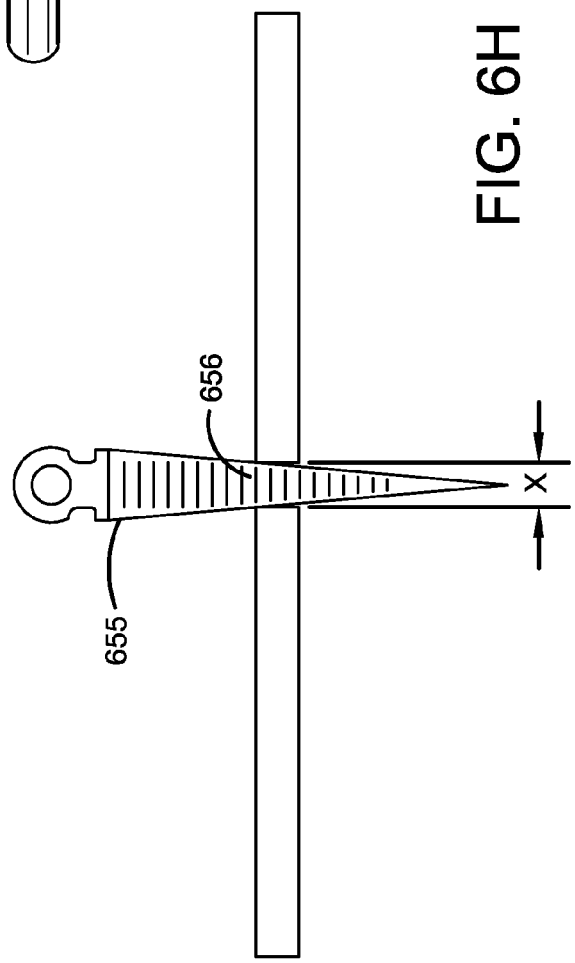

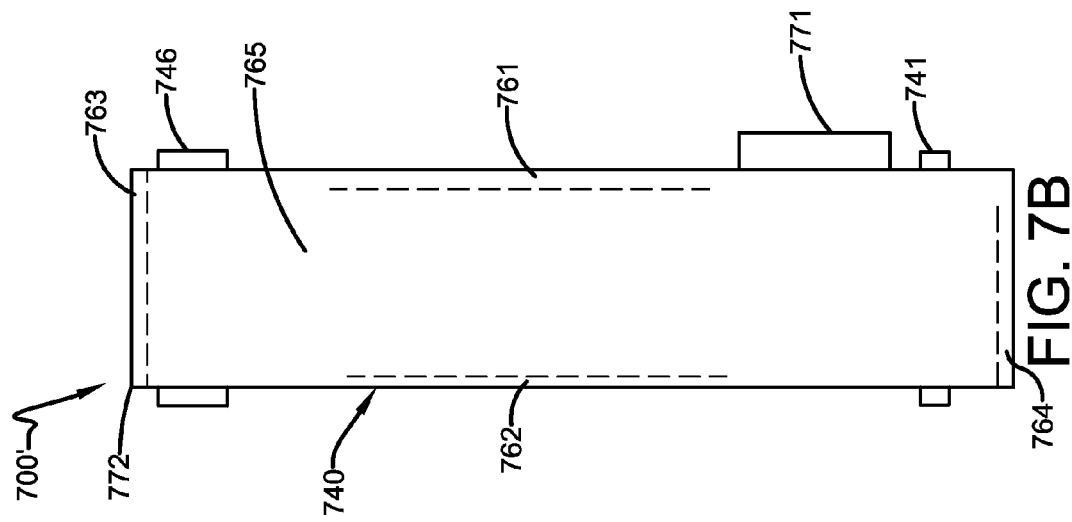
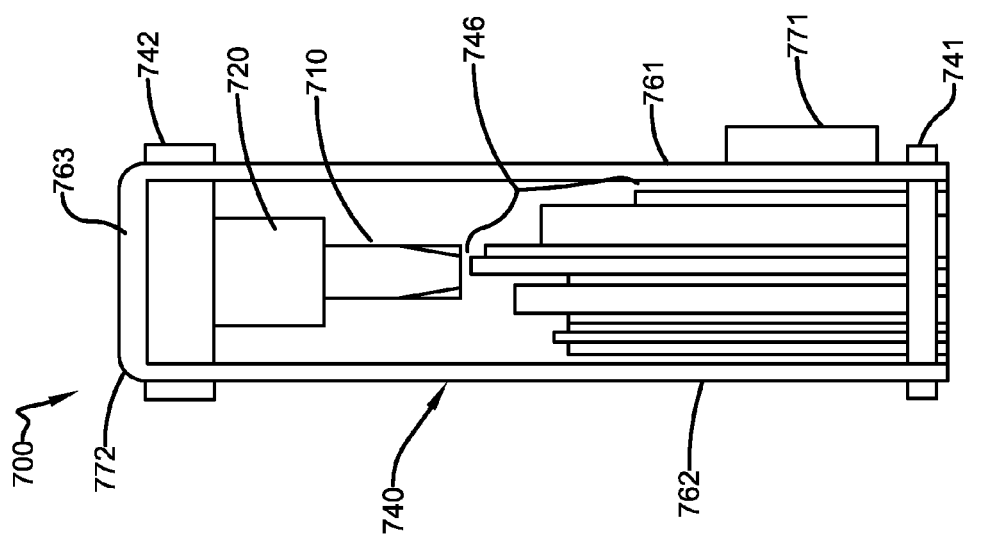

WELDING PLIERS MULTI-TOOL

CROSS-REFERENCE TO RELATED APPLICATIONS

The present application claims the benefit of U.S. Provisional Patent Application 61/866,231, entitled WELDING PLIERS MULTI-TOOL filed on Aug. 15, 2013, the entirety of which is incorporated herein by reference.

TECHNICAL FIELD

Devices, systems, and methods consistent with the invention relate generally to multi-tools, and more particularly, to combining multiple welding tools.

BACKGROUND OF THE INVENTION

People and equipment associated with creating and inspecting welds utilize a number of tools, some of which are specialized for welding purposes. These tools can often be stored and transported individually without protection for the tools or the user of the tools.

When a collection of tools are stored or transported individually as described, they may be prone to become misplaced. The tools can also be damaged by impact with other tools, impact with a hard surface after a fall, and so forth. Further, a user carrying a relatively large number of tools can be poked, jabbed, or otherwise negatively affected by the tools as the user tries to grasp the tools within a pocket or a toolbox.

Current methods for storing and transporting welding tools can include a random array of tools kept within a tool box, pocket, or other expedient means. As such, consistently locating and protecting individual tools can be difficult, and users can be negatively affected by the lack of safety considerations involving loose tools. Further, many of these tools lack substantial handles or grips enabling a user to have adequate leverage to apply suitable force or torque to the tools.

Multi-tools available on the market today are typically designed for general use. They may include blades or common-sized drivers, but are difficult to adapt to the highly-specific realm of welding. Further, heat and other environmental hazards associated with welding may render common multi-tools inappropriate for use by a welder or in conjunction with welding machines.

SUMMARY OF THE INVENTION

In accordance with the present invention, there is provided a welding equipment hand tool, comprising a first handle, a second handle mechanically coupled to the first handle, and a welding pliers including at least two pliers jaws, wherein the welding pliers are opened or closed based at least in part on the position of the second handle in relation to the first handle, and wherein the at least two pliers jaws are configured to stow in a pliers recess of at least one of the first handle and the second handle. The welding equipment hand tool further comprises a welding nozzle cleaner attached to one of the first handle and the second handle, wherein the welding nozzle cleaner is configured to stow in a welding nozzle cleaner recess of at least one of the first handle and the second handle. The welding equipment hand tool also includes a welding fillet gauge attached to one of the first handle and the second handle, wherein the welding fillet gauge is configured to stow in a welding nozzle cleaner recess of at least one of the first handle and the second handle. Finally, the welding equipment hand tool includes a welding thickness gauge attached to at least one of the first handle and the second handle, wherein the welding thickness gauge is configured to stow in a welding nozzle cleaner recess of at least one of the first handle and the second handle.

In accordance with the present invention, there is provided a pliers welding multi-tool, comprising two handles, wherein each of the two handles comprises at least a pair of sidewalls, wherein a space is defined between the pair of sidewalls, two pliers pins, where one of the two pliers pins is operatively attached to each of the two handles to facilitate rotation of each of the two handles about each axis defined by each of the two pliers pins, and welding pliers operated by motion of the two handles, wherein the welding pliers are stowed in or removed from the space by rotating each of the two handles about the axis defined by each of the two pliers pins. The pliers welding multi-tool also includes at least one tool pin, wherein the at least one tool pin is operatively attached to one of the two handles, and a plurality of tools is operatively attached to the at least one tool pin, wherein rotation of the plurality of tools into or out of the space is facilitated by movement about an axis defined by the at least one tool pin.

Various other embodiments are disclosed other than those described. These and other objects of this invention will be evident when viewed in light of the drawings, detailed description, and appended claims.

BRIEF DESCRIPTION OF THE DRAWINGS

The above and/or other aspects of the invention will be more apparent by describing in detail embodiments of the invention with reference to the accompanying drawings, in which:

FIGS. 6C, 6D, and 6E are additional views of a bevel-angle tool as pictured in FIG. 6A;

FIGS. 6F and 6G are additional views of a plate and rod gauge as pictured in FIG. 6A;

FIG. 6H is an additional view of a root gap gauge as pictured in FIG. 6A; and FIGS. 7A and 7B illustrate embodiments of a pliers welding multi-tool as viewed from the side in a closed configuration.

DETAILED DESCRIPTION

Figures 1A, 1B:
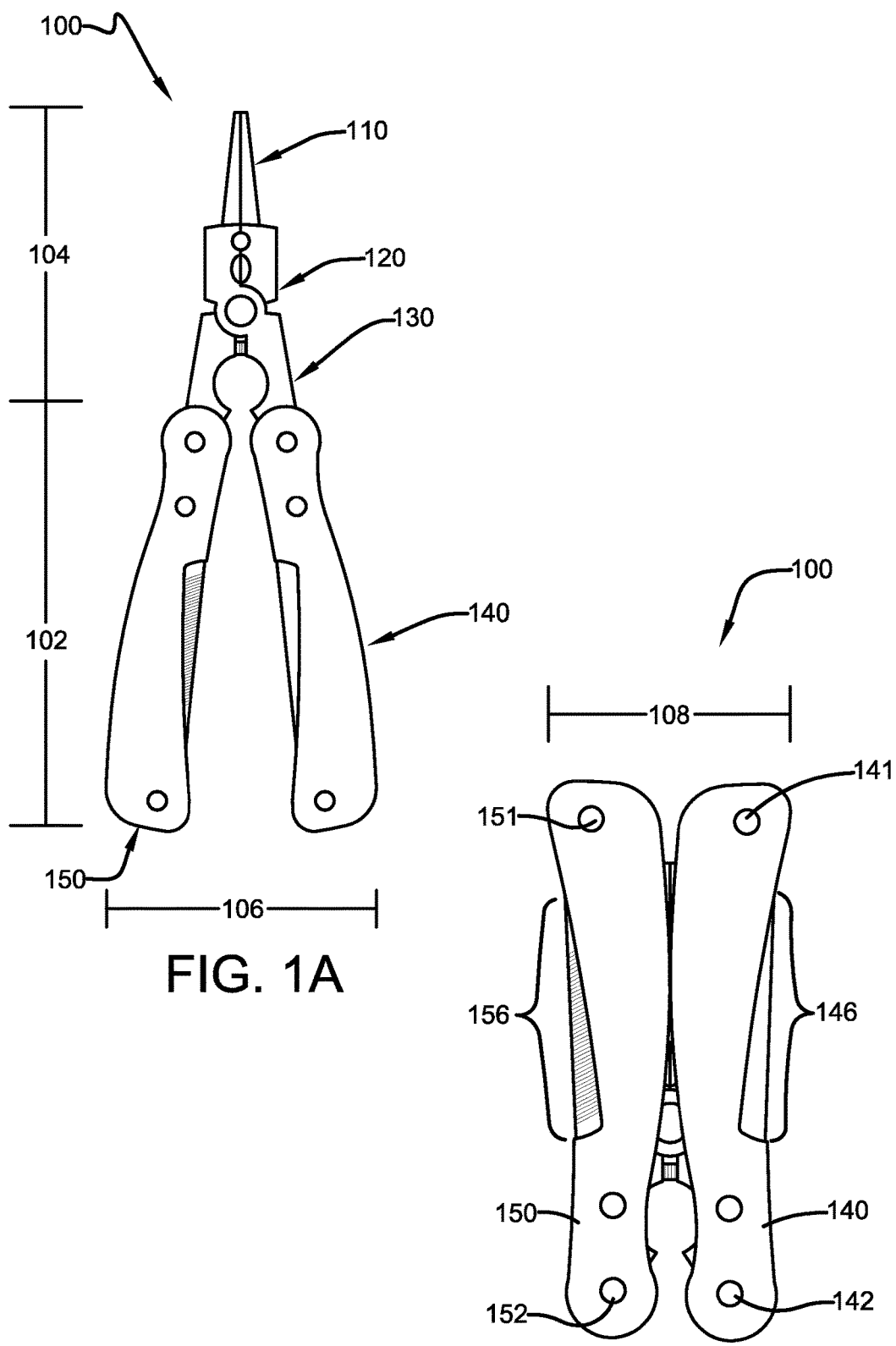
FIGS. 1A, 1B, 1C, and 1D illustrate views of an example pliers welding multi-tool.

Embodiments of the invention will now be described below by reference to the attached figures. The described embodiments are intended to assist the understanding of the invention, and are not intended to limit the scope of the invention in any way. Like reference numerals refer to like elements throughout.

Generally, a pliers welding multi-tool can be provided. The pliers welding multi-tool can include pliers that provide specific functionality directed toward welding. In addition to the welding pliers, the pliers welding multi-tool can have multi-tool function built into one or both pliers handles. One or more tools having a narrow cross-section (e.g., less than the cross-section of a multi-tool handle, sums with the cross-section of other tools to have a total cross-section less than the cross section of a multi-tool handle) can be stowed (e.g., placed in a "home" position) within the pliers handle. To access tools, the tools can be rotated, slid, or otherwise removed for use when needed. As with the pliers, the tools of the multi-tool portion can have welding-specific purposes.

In an embodiment of a welding equipment hand tool herein, the welding equipment hand tool can include a first handle and a second handle mechanically coupled to the first handle. The first and second handle bodies can be connected to a welding pliers including at least two pliers jaws, wherein the welding pliers are opened or closed based at least in part on a position of the second handle in relation to the first handle, and wherein the at least two pliers jaws are configured to stow in a pliers recess of at least one of the first handle and the second handle.

Various tools can be included in the welding equipment hand tool. Specifically, a welding nozzle cleaner, a welding fillet gauge and a welding thickness gauge can be incorporated into the welding equipment hand tool. These tools can be attached to at least one of the first handle and the second handle, and configured to stow in a respective recess or portion of a recess defined by an inner portion of at least one of the first handle and the second handle.

In an embodiment of a pliers welding multi-tool, there are included two handles, wherein each of the two handles comprises at least a pair of sidewalls, and a space is defined between the pair of sidewalls. This space can be hollow or configured to accommodate at least a portion of one or more tools that can be removably stowed therein. The multi-tool can also include two pliers pins, wherein one of the two pliers pins is operatively attached to each of the two handles to facilitate rotation of each of the two handles about each axis defined by each of the two pliers pins. By rotating the handles about the pins, welding pliers are exposed or stowed. Specifically, the welding pliers are stowed in or removed from the space by rotating each of the two handles about each axis defined by each of the two pliers pins. The welding pliers are operated by motion of the two handles. The multi-tool further includes at least one tool pin, wherein the at least one tool pin is operatively attached to one of the two handles. A plurality of tools are operatively attached to the at least one tool pin, wherein rotation of the plurality of tools into or out of the space is facilitated by movement about an axis defined by the at least one tool pin.

Another embodiment disclosed herein relates to a welding multi-tool. The welding multi-tool includes a first pliers handle defining a first pliers recess between a first front face of the pliers handle and a first rear face of the pliers handle. The first front face of the pliers handle and the first rear face of the pliers handle have substantially identical nonlinear planar contours defining at least a first portion of an ergonomic gripping shape. A second pliers handle is mechanically coupled to the first pliers handle. The second pliers handle defines a second pliers recess between a second front face of the pliers handle and a second rear face of the pliers handle. The second front face of the pliers handle and the second rear face of the pliers handle have substantially identical nonlinear planar contours defining at least a second portion of an ergonomic gripping shape, and the first portion of the ergonomic gripping shape and the second portion of the ergonomic gripping shape combine to define a shape easily gripped by a palm during movement of the first pliers handle and the second pliers handle with respect to one another. The multi-tool also comprises a welding pliers including a first pliers jaw and a second pliers jaw, where the first pliers jaw is rotatably connected to the first pliers handle using a first pliers pin and the second pliers jaw is rotatably connected to the second pliers handle using a second pliers pin. The first pliers pin and the second pliers pin enable the first pliers handle and the second pliers handle to be respectively rotated about the first pliers pin and the second pliers pin such that the welding pliers are encapsulated within one or both of the first pliers recess and the second pliers recess, and the first pliers jaw and the second pliers jaw are mechanically coupled at a pliers fulcrum. In addition, the welding pliers are opened or closed based at least in part on a position of the second pliers handle in relation to the first pliers handle, and the at least two pliers jaws are configured to stow in at least one of the first pliers recess and the second pliers recess.

This embodiment of the multi-tool can also include several tools. Some tools can be built into the pliers such as a welding torch nozzle remover of the welding pliers formed of a portion of the welding pliers on a first side of the fulcrum, where the first side of the fulcrum is disposed toward the first pliers handle and the second pliers handle. Also included in the pliers is a welding torch tip remover of the welding pliers formed of a portion of the welding pliers on a second side of the fulcrum, where the second side of the fulcrum disposed toward an end of the first pliers jaw and second pliers jaw distal from the first pliers handle and the second pliers handle. Tools separate from the pliers portion of the multi-tool can be organized in groups such as a first plurality of tools rotatably connected to the first pliers handle using a first tool pin, where the first plurality of tools are configured to stow in the first pliers recess, and a second plurality of tools rotatably connected to the second pliers handle using a second tool pin, where the second plurality of tools are configured to stow in the second pliers recess. Specific tools can be organized in the same recess, such as a welding nozzle cleaner, a welding fillet gauge bevel angle tool, a welding thickness gauge, a welding nozzle cleaner, a root gap gauge, and a plate and rod gauge, which can all be among the first plurality of tools.

As used herein, a hand tool, multi-tool, or similar term indicates a tool for manual use. By modifying a hand tool or multi-tool with terms relating to welding, welding equipment, or similar language, it is indicated that the tool is configured for use with welders and/or welding operations. In embodiments, such configuration indicates the inclusion of tools specifically sized and shaped for use with one or more welders (e.g., hybrid arc welder) and/or one or more welding operations (e.g., measure bead size, measure angle). Similarly, welding pliers, or other specific tools incorporated into a multi-tool which are described as "welding," indicate a particular configuration or relevance to welding (e.g., sized for use with welders or torches, sized or shaped for use with welding work pieces).

In multi-tools configured to stow one or more tools, the space in which the tools are stowed can be a recess defined by the outer construction of one or more handles, grips, or other portions of the tool. Stowing can at least partially move or collapse the tool into the recess, such that the tool is safely surrounded by the outer construction or other tools. In configurations, such as those illustrated, where one or more tools are mounted along a pin and rotate about the pin to stow or remove a tool, the tool can return to the same portion of the larger recess each time, as its motion is limited to a substantially two-dimensional arc. Accordingly, the space occupied by each tool can be referred to as its own tool recess, which is a subset of the larger recess in embodiments storing multiple tools in the recess.

Further, in embodiments having two or more recesses (e.g., two handles of a pliers), the recess into which a particular tool is integrated can be selected according to workflow or convenience. For example, tools likely to be used simultaneously or in concert may be placed in the same recess for quick swapping, or in different recesses such that both can be exposed simultaneously without interfering with use of either.

Figure 1C:
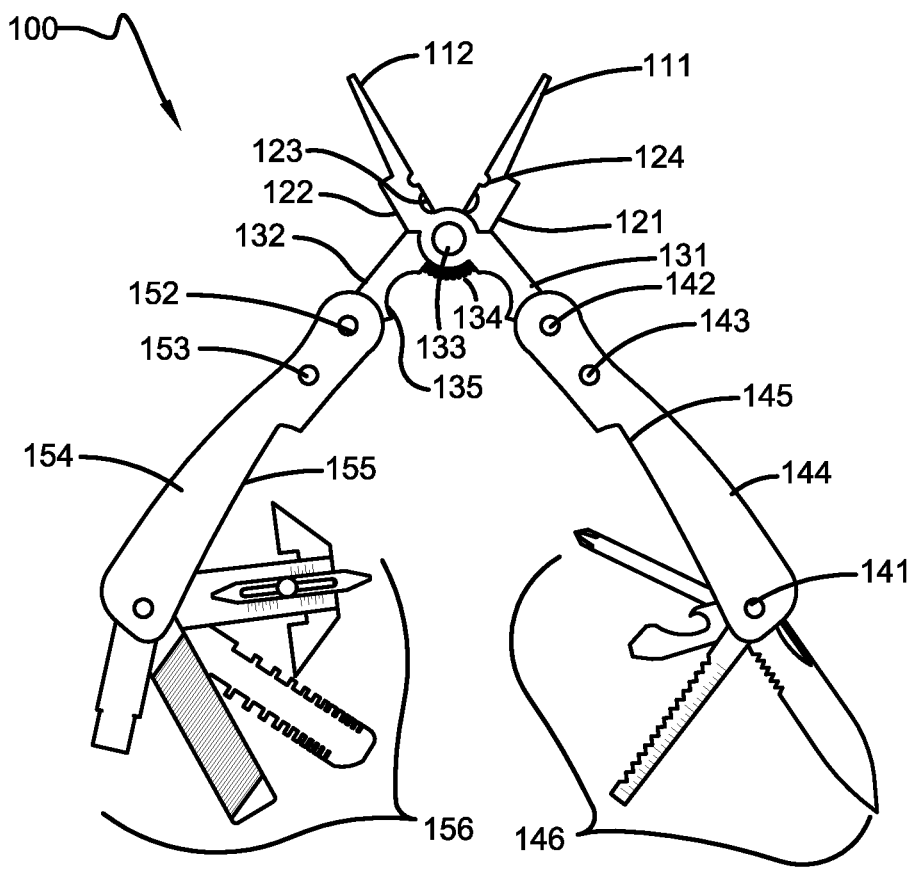
Figure 1D:
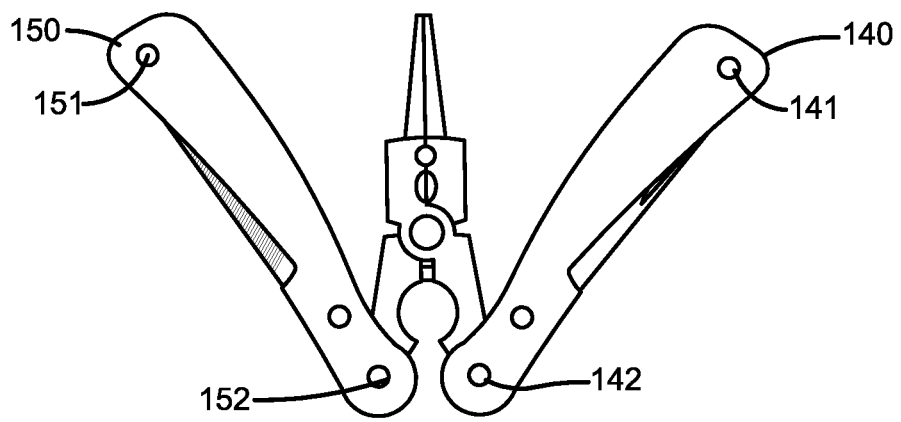

Turning now to FIGS. 1A-1D, illustrated are views of an example pliers welding multi-tool 100. Pliers welding multi-tool 100 is shown in an open configuration in FIGS. 1A and 1C, such that the pliers portion is accessible for use. In FIG. 1B, pliers welding multi-tool 100 is shown in a closed position, where groups of tools 146 and 156 can still be accessed by rotating one or more of groups of tools 146 and 156 out of handles 140 and 150, but the pliers portion (including pliers nose 110, pliers base 120, and pliers arms 130) is stowed within at least a portion of one or both of handles 140 and 150. FIG. 1D shows pliers welding multi-tool transitioning between the open position and closed position.

Specifically with regard to FIG. 1A, pliers welding multi-tool 100 is shown in an open configuration with a pliers portion accessible and shut. The pliers portion includes pliers nose 110, pliers base 120, and pliers arms 130. Pliers arms 130 can be rotatably attached to handles 140 and 150, such that the pliers portion can be opened or shut based on the position of handles 140 and 150 when the pliers welding multi-tool is in an open position.

Pliers welding multi-tool 100 has a handle length 102 and a pliers length 104. When in an open position, pliers welding multi-tool 100 has a total length substantially equal to the sum of handle length 102 and pliers length 104 (although this length may be increased if one or more of groups of tools 146 and 156 are rotated outward). When in an open position, pliers welding multi-tool 100 has a width 106 representing the widest dimension of pliers welding multi-tool 100. When in a closed configuration, pliers welding multi-tool 100 has a length substantially equal to handle length 102, and a closed width 108 substantially equal to the width of both grips at their base. It is understood that total widths and lengths described may vary depending on the angle or angles between components of pliers welding multi-tool 100.

Additional aspects are indicated in FIG. 1B. FIG. 1B depicts pliers welding multi-tool 100 in a closed configuration, such that the pliers portion is stowed in at least a part of handles 140 and 150. Handles 140 and 150 also store groups of tools 146 and 156. In embodiments, groups of tools 146 and 156 can be configured to remain accessible (e.g., at least partially removable from respective handle, positioned for utilization in one or more fashions) whether pliers welding multi-tool 100 is in an open or closed position.

FIG. 1B indicates tool pins 141 and 151, and pliers pins 142 and 152. One or more of tool pins 141 and 151, and/or pliers pins 142 and 152 are configured to permit rotation of components of pliers welding multi-tool 100 about an axis coincident with the center of the respective pin. Tool pins 141 and 151 are configured to allow connected tools to be rotated from a stowed position (e.g., where the tool is at least partially recessed into a respective handle to which it is connected) to an opened configuration (e.g., where the tool is at least partially exposed beyond the edges of a respective handle such that the tool can be utilized in at least one fashion). One or more of tool pins 141 and 151, and pliers pins 142 and 152, can be flush with the respective surface contour of handles 140/150. In alternative embodiments, one or more of these pins can extend beyond the respective surface contour of handles 140/150. In some such embodiments, the pins can be capped, covered, rounded, tapered, and so forth, to improve ergonomics, reduce snagging, provide a desired aesthetic, et cetera.

Specifically with regard to tool pins 141 and 151, these pins can be attached toward an end of handles 140 and 150 opposite pliers pins 142 and 152. Tool pins 141 and 151 can facilitate rotation of one or more of groups of tools 146 and 156 about an axis of the pins. Specifically, tools among groups of tools 146 and 156 can be taken out of handle(s) 140 and/or 150 one at a time or in groups by being rotated about the axis. In embodiments, tool pins 141 and 151 can rotate within handles 140 and 150. In alternative embodiments, tool pins 141 and 151 are fixed and do not rotate within handles 140 and 150, but groups of tools 146 and 156 rotate about tool pins 141 and 151. Various combinations of parts can be permitted to rotate without departing from the scope or spirit of the innovation.

Tool pins 141 and 151 can be configured to restrict rotation of one or more of groups of tools 146 and 156. Specifically, various pins, detents, grooves, resistive portions, and/or locking mechanisms can be employed to retain one or more tools among groups of tools 146 and 156 at a particular position. For example, a tool can be locked in an opened configuration, such that the tool is secure for use. In alternative or complementary embodiments, a tool can be locked in a closed position such that it will not unintentionally release from its respective handle. In embodiments, tool pins 141 and 151 (alone or in combination with the portions of groups of tools 146 and 156 with which they respectively mate) can include resistive points that resist motion of one or more of groups of tool 146 and 156 outside of a specific region. For example, a detent in tool pin 141 and corresponding groove in a tool of group of tools 146 can mate such that the tool is not immovably locked in its position, but that an increased force must be applied to rotate the tool from such position compared to rotation through other portions of its arc. In alternative or complementary embodiments, flared, tapered, textured, magnetized, or otherwise asymmetrical sections may be utilized to increase or reduce resistance in particular positions.

With respect to pliers pins 142 and 152, these pins can be attached toward an end of handles 140 and 150 opposite tool pins 141 and 151. Pliers pins 142 and 152 can facilitate rotation of handles 140 and 150 about an axis of the pins, at least in part to change their position relative to pliers arms 131 and 132. In alternative or complementary embodiments, pliers arms 131 and 132 can be rotated (vice handles 140 and 150). In embodiments, pliers pins 142 and 152 can rotate while one or more of handles 140 and 150 and/or pliers arms 131 and 132 remain fixed (at least relative to another component or subcomponent). In alternative embodiments, pliers pins 142 and 152 are fixed and do not rotate within handles 140 and 150, but one or more of pliers arms 131 and 132 rotate about pliers pins 142 and 152. Various combinations of parts can be permitted to rotate without departing from the scope or spirit of the innovation.

Pliers pins 142 and 152 can be configured to restrict rotation of one or more of pliers arms 131 and 132 and/or handles 140 and 150. Specifically, various pins, detents, grooves, resistive portions, and/or locking mechanisms can be employed to retain one or more components at a particular position. For example, the pliers can be locked in an open configuration, such that the pliers are secure for use and will not rotate out of position even when the pliers portion is opened or closed by moving handles 140 and 150. In alternative or complementary embodiments, the pliers can be locked in a closed position such that it will not unintentionally open. In embodiments, pliers pins 142 and 152 (alone or in combination with the portions of pliers arms 131 and 132 and/or handles 140 and 150 with which they respectively mate) can include resistive points that resist motion outside of a specific region of rotation. For example, a detent in pliers pin 142 and corresponding groove in pliers arm 131 can mate such that the pliers is not per se locked in its position, but that an increased force must be applied to rotate pliers arm 131 and/or pliers pin 142 from such position compared to rotation through other portions of its arc. In alternative or complementary embodiments, flared, tapered, textured, magnetized, or otherwise asymmetrical sections may be utilized to increase or reduce resistance in particular positions.

While tool pins 141 and 151 and pliers pins 142 and 152 are discussed as being disposed toward ends of handles 140 and 150, it is understood that these or similar components can be located elsewhere throughout pliers welding multi-tool 100 without departing from the scope or spirit of the innovation.

In embodiments, a lock and/or release can be incorporated into handle(s) 140 and/or 150 such that rotatable portions (e.g., groups of tools 146 and 156, handles 140 and 150, pliers arms 131 and 132) can be locked into place and/or released to or from a specific position. For example, a button, slider, latch, or other component(s) (not illustrated) can be included in pliers welding multi-tool 100.

While discussion of tool pins 141 and 151, pliers pins 142 and 152, and other portions herein focuses on rotatable stowing and access of components of pliers welding multi-tool 100, one of ordinary skill will understand that various components can be otherwise stowed and removed (e.g., slidably) from components of pliers welding multi-tool 100 without departing from the scope or spirit of the innovation. For example, in at least one embodiment, no rotation occurs between handles 140/150 and a pliers portion, but instead the pliers portion slides in and out of handles 140/150 along a lengthwise direction of travel, and the tool collapses to a closed configuration where handles 140/150 are substantially flush against one another when the pliers portion is retracted therein. Similarly, in one or more embodiments, at least one tool among groups of tools 146/156 can slide in or out of handle 140/150 a lengthwise or widthwise direction as opposed to or in combination with rotating about a portion of handle 140/150.

FIG. 1C indicates additional details of pliers welding multi-tool 100. Pliers nose 110 can include jaws 111 and 112. Pliers base 120 can include bases 121 and 122. Pliers bases 121 and 122 can include other tools, such as wire cutter 123 and tip remover 124. Tip remover 124 can be used to remove the tip of a welding gun. Pliers bases 121 and 122 transition to pliers arms 131 and 132, which are respectively coupled by pliers fulcrum 133 to facilitate rotation opening or shutting the pliers portion. In embodiments, a respective half of the pliers portion (e.g., pliers jaw 111, pliers base 121, and pliers arm 132 comprising one side of a pliers portion) can be formed of a continuous portion of material. In alternative embodiments, a respective half of the pliers portion is formed by combining two or more discrete components. Pliers arms 131 and 132 also accommodate pliers spring 134 below pliers fulcrum 133, which can be used to spring-load the pliers portion or handles 140/150. In addition, pliers arms 131 and 132 include nozzle remover 135, which can be used to remove a welding gun nozzle.

In specific embodiments, handles 140 and 150 can include reinforcement(s) 143 and 153. Reinforcements 143 and 153 may not specifically attach to a tool (e.g., pliers, tool among groups of tools 146 and 156), but can provide additional strength to one or more of handles 140 and 150. In addition, reinforcements 143 and/or 153 can prevent rotation of a particular component (e.g., pliers arm) beyond a certain point by acting as a stop or block. For example, pliers arm 131 and attached portions can be prevented from rotating an amount beyond that required to place pliers welding multi-tool 100 into a closed configuration (e.g., to prevent the pliers portion from impacting group of tools 146, to prevent the pliers portion from rotating through handle 140 such that handle 150 cannot be positioned for proper closing). Other reinforcements or similar members (not pictured) can be provided for aesthetic or other purposes.

Handles 140 and 150 can additionally include grip portions 144 and 154, and cutaway portions 145 and 155. Grip portions 144 and 154 can be shaped or configured to facilitate holding of pliers welding multi-tool 100 and use of its respective tools. For example, grip portions 144 and 154 can be flared, rounded, textured, et cetera, to fit the palm of a user's hand. Cutaway portions 145 and 155 can include one or more tapered, stepped, grooved, or cutaway portions (e.g., with respect to the straight inner contour of handles 140 and 150) to facilitate viewing, identification, and removal or opening of one or more tools among groups of tools 146 and 156. In embodiments, at least one among groups of tools 146 or 156 includes a textured portion, recess, or other aspect to make easier the respective tool's removal from handle 140 or 150. Such aspect can be made accessible using cutaway portions 145 or 155.

Further, one or both of handles 140 and 150 can be of multi-part or multi-material construction. For example, in embodiments, handles 140 and/or 150 can have a skeletal construction of one material (e.g., stainless steel) and be capped, surrounded, or reinforced by a various plates or end pieces (e.g., aluminum) (not pictured). These additional pieces can serve function purposes (e.g., avoid accumulation or contamination of debris, provide different gripping surfaces, reinforce structure) or satisfy aesthetic preferences (e.g., design or color options, different shaping).

FIG. 1D illustrates pliers welding multi-tool 100 in a partially-open position. In embodiments, pliers welding multi-tool 100 can be used (e.g., to fit into a confined space) for at least one purpose in a partially-open configuration. In specific embodiments, a locking portion (not pictured) can be used to secure pliers welding multi-tool 100 in one or more partially-open configurations such that pliers welding multi-tool 100 is prevented from shifting to a fully open or closed position until the locking portion is released.

Figure 2:
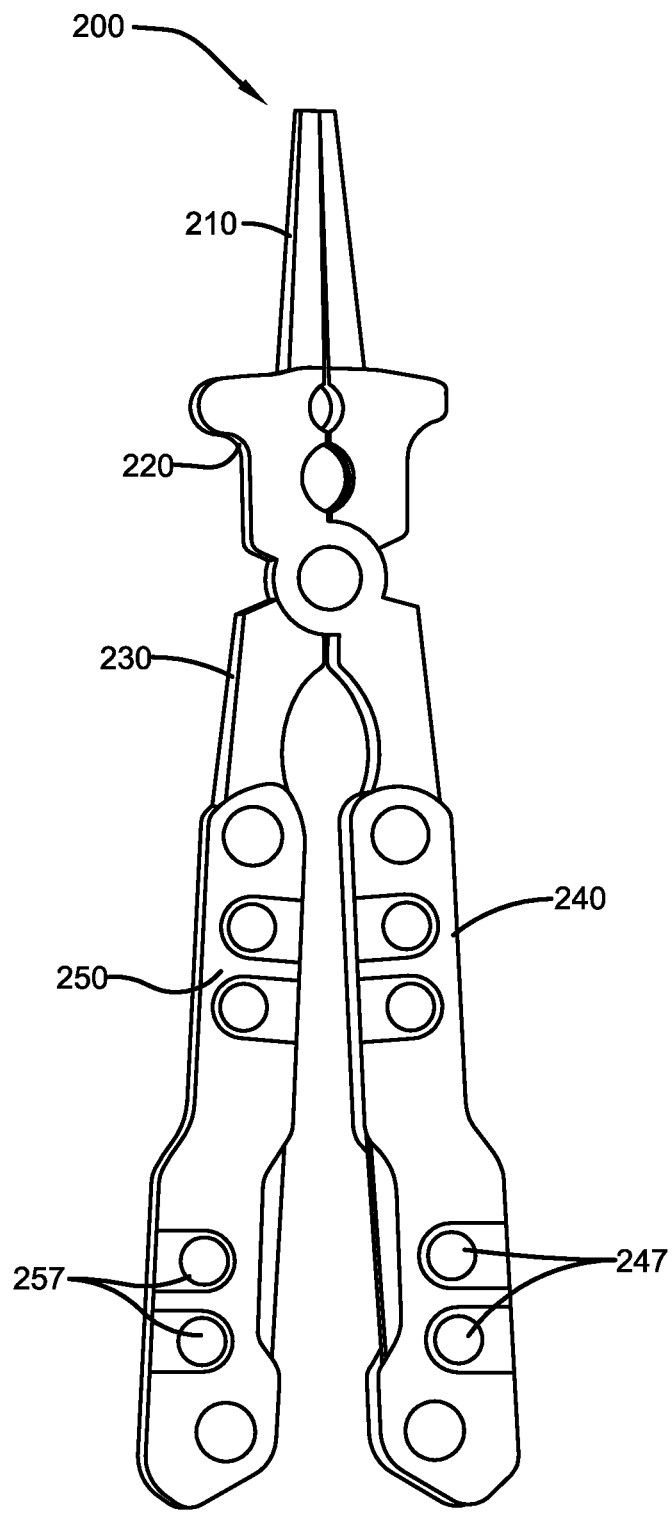
FIG. 2 illustrates another embodiment of a pliers welding multi-tool.

Turning now to FIG. 2, illustrated is another embodiment of pliers welding multi-tool 200. Pliers welding multi-tool 200 includes pliers nose 210, pliers base 220, pliers arms 230, and pliers handles 240 and 250. In embodiments, pliers handles 240 and 250 can include holes 247 and 257 to facilitate user grip and/or identification of or access to tools stowed within handles 240 and 250. In embodiments, one or more of holes 247 and 257 can be provided for aesthetic purposes. One or more of holes 247/257 can be surrounded by a curved indentation or recess provided for one or all of grip, ergonomics, or aesthetics. While holes 247 and 257 are shown as circular, same-sized cutouts, it is understood that such configurations can be varied without departing from the scope or spirit of the innovation. For example, various shapes (e.g., ellipses, polygons, and others in varying combinations), sizes (e.g., sized different than shown, combinations of different sizes), numbers of cutouts (e.g., a greater or fewer number of cutouts, different number of cutouts on handle 240 compared to handle 250), and locations (e.g., cutout location different than those shown, cutout location different on handle 240 compared to handle 250) can be employed at the discretion of one of ordinary skill in the art, and can be modified to effect a desired aesthetic.

Figure 3A:
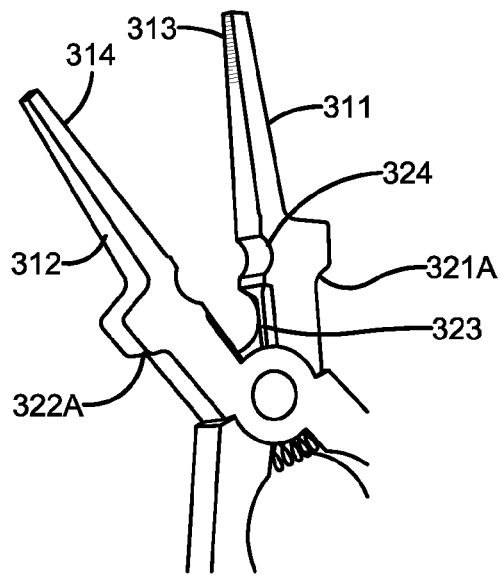
FIGS. 3A, 3B, and 3C illustrate various embodiments of a pliers portion of a pliers welding multi-tool.
Figure 3B:
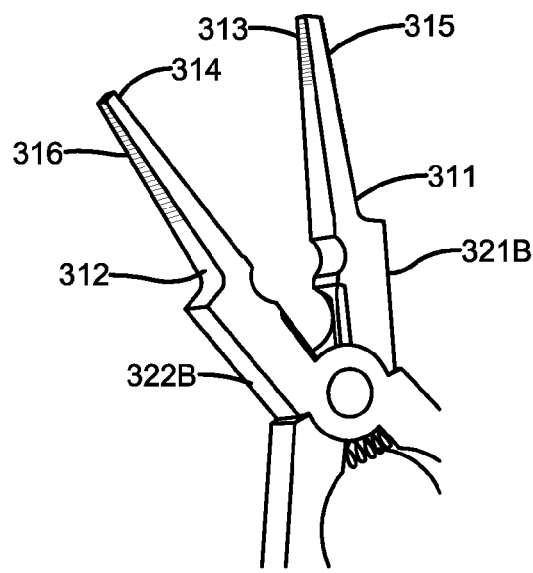
Figure 3C:
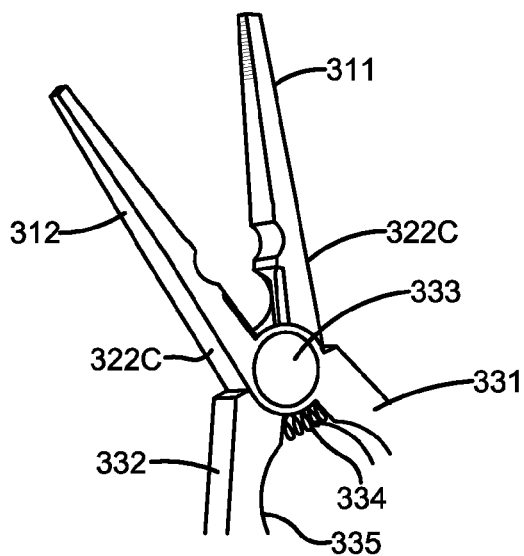

With regard to FIGS. 3A-3C, illustrated are various embodiments of a pliers portion of a welding pliers. As described elsewhere herein, a pliers portion can include a nose portion having jaws 311 and 312. Jaws 311 and 312 can be connected to respective bases, which couple by way of axis 333. A welding pliers can also include pliers arms 331 and 332. Pliers arms can include nozzle remover 335. Nozzle remover 335 can be a specially-sized, substantially round tool including textured portions to facilitate removal of a welding nozzle.

FIG. 3A illustrates pliers having a protruding portion in bases 321A and 322A. The protruding portion of bases 321A and 322A can permit use of the pliers as an anvil or mallet in some instances. Also illustrated in FIG. 3A is textured portions 313 and 314, which can include grooves, serrations, cross-hatches, or other surface features on at least a portion of one side of jaws 311 and 312 to improve gripping or reduce slipping of jaws 311 and 312 when shut on a variety of materials. The pliers portion illustrated in FIG. 3A can further include wire cutter 323, tip remover 324, and nozzle remover 335. Wire cutter 323 can be used to cut welding wire or other appropriately-sized portions of metal or other materials. Tip remover 324 can be used to remove the tip at the end of a welding torch or other tool by way of its size, positioning, and textured interface.

FIG. 3B illustrates an alternative embodiment of a pliers portion. In FIG. 3B, bases 321B and 322B are shown without protruding portion, but are still stepped out to a wider configuration from jaws 311 and 312. The stepped profile of bases 321B and 322B can be employed to ensure sufficient strength about axis 333, facilitate integration of tools such as wire cutter 323 or tip remover 324, for use as a small anvil, or for other purposes.

FIG. 3B also shows jaws textured portions 313-316 on both sides of jaws 311 and 312. In one or more embodiments, texturing can be provided on one or both sides of either or both of jaws 311 and 312. As discussed, texturing on jaws 311 and 312 can facilitate grip of an item between jaws 311 and 312. Texturing disposed toward the outside of jaws 311 and 312 can be used for scraping, precise positioning, or to prevent slipping when one or more of jaws 311 and 312 is braced against another object. It will be appreciated, upon review of the disclosures herein, that texturing can extend for along any portion of the length of jaws 311 or 312. For example, texturing can extend the entire length; half of the length; only be included at middle or bottom portion of jaws 311/312; or in any other configuration(s) other than those illustrated.

FIG. 3C illustrates a pliers portion where portions 321C and 322C have a substantially similar width or cross-section to that of the widest portion of jaws 311 and 312. By way of this design, jaws 311 and 312 can be permitted to reach into spaces that would be inaccessible to designs having wider portions. 3C also provides a view of pliers spring 334, which provides a spring-loading effect for handles (e.g., 240/250) and/or a pliers portion.

While FIGS. 3A-3C illustrate various embodiments and combinations of aspects, it is understood that such aspects can be included or excluded from other embodiments, and that different combinations or variants of the specific designs illustrated can be utilized without departing from the scope or spirit of the innovation.

Figure 4:
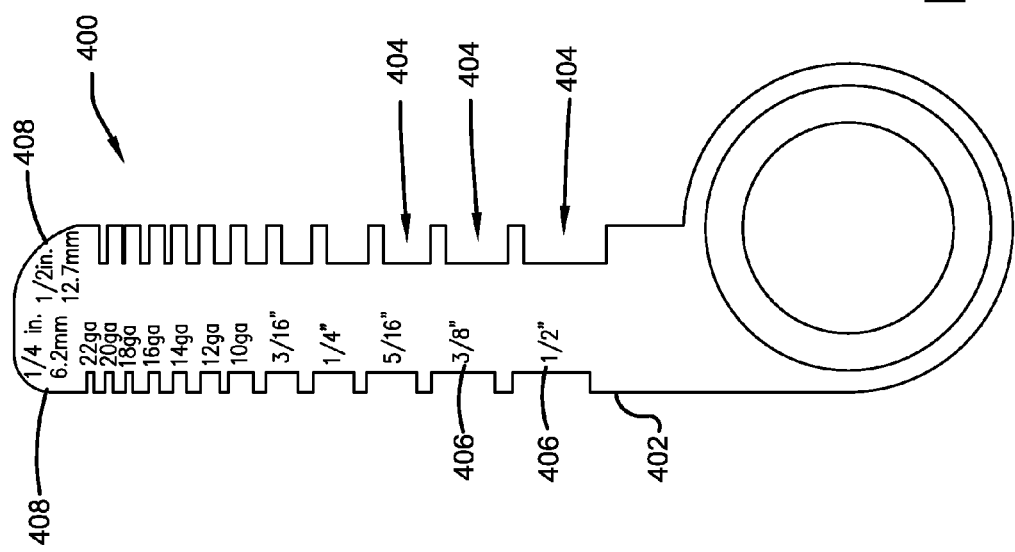
FIG. 4 illustrates a front view of an example thickness gauge which can be included in a pliers welding multi-tool.

Turning to FIG. 4, the pliers welding multi-tool also includes a thickness gauge 400. The thickness gauge 400 includes a main portion 402. The main portion 402 defines a plurality of notches 404 located on at least one edge of the main portion 402. Each of notches 404 are formed to correspond with standardized nominal thicknesses of materials (e.g., sheet and plate metals). Each of the notches 404 includes a label 406 indicating the nominal width of the notch 404 as measured along the edge of the main portion 402. As some welding requirements are based upon the thickness of the materials to be welded, the thickness gauge 400 enables the user to quickly and accurately measure the thickness of the materials in order to determine proper weld requirements. In order to determine the thickness of the material, the user can remove the thickness gauge 400 from its home position and slide the material whose thickness is to be measured into at least one of the notches 404 until a snug fit is found. The user can then read the nominal thickness of the material from the label 406 corresponding to the notch in use (e.g., notch 404). Notch 404 dimensions can be replicated on opposing edges of the thickness gauge 400 for the user's convenience, and one label can correspond with two notches 404.

Figure 6A:
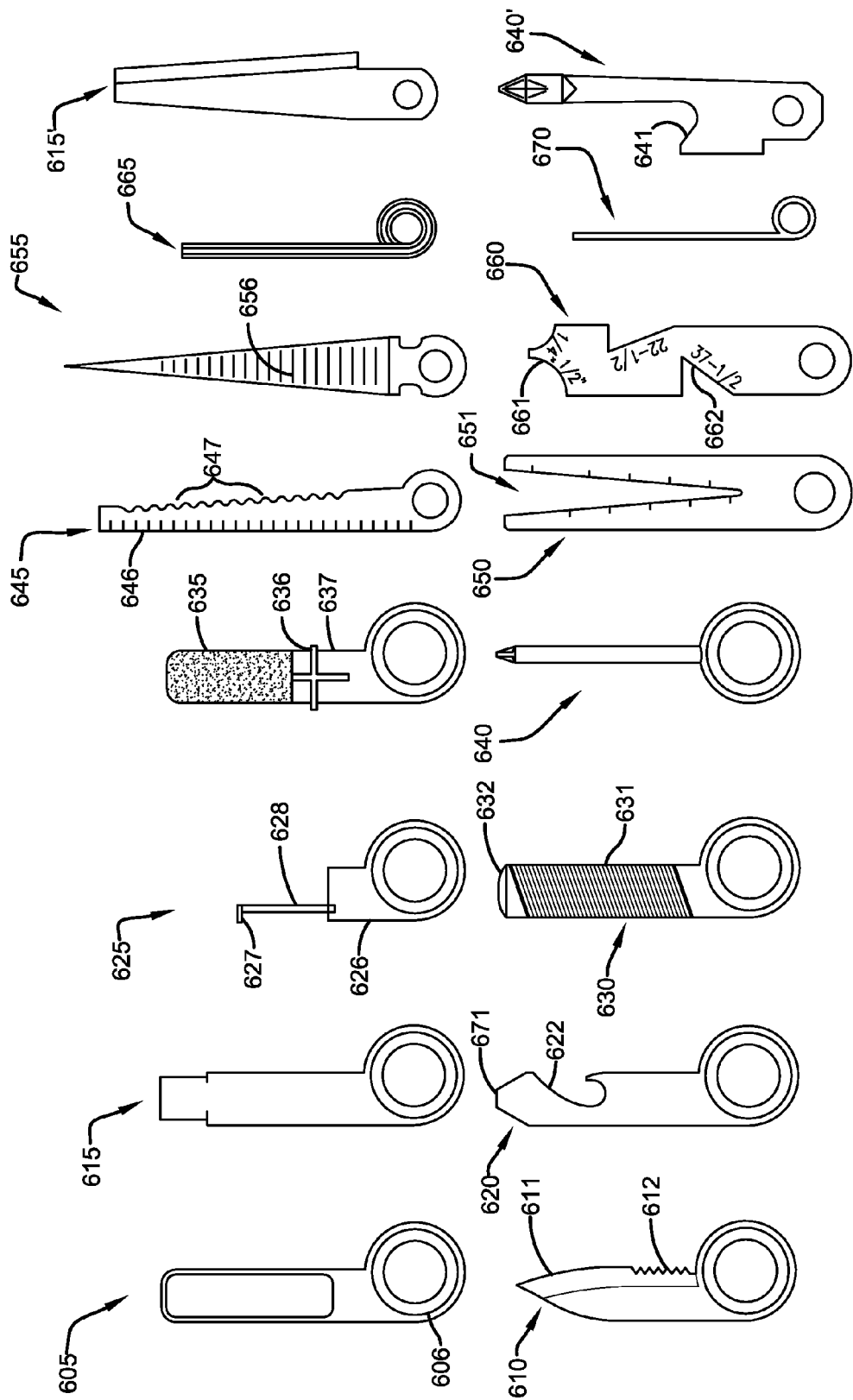
FIG. 6A is a front view of additional tools which can be included in a pliers welding multi-tool.
Figure 6B:
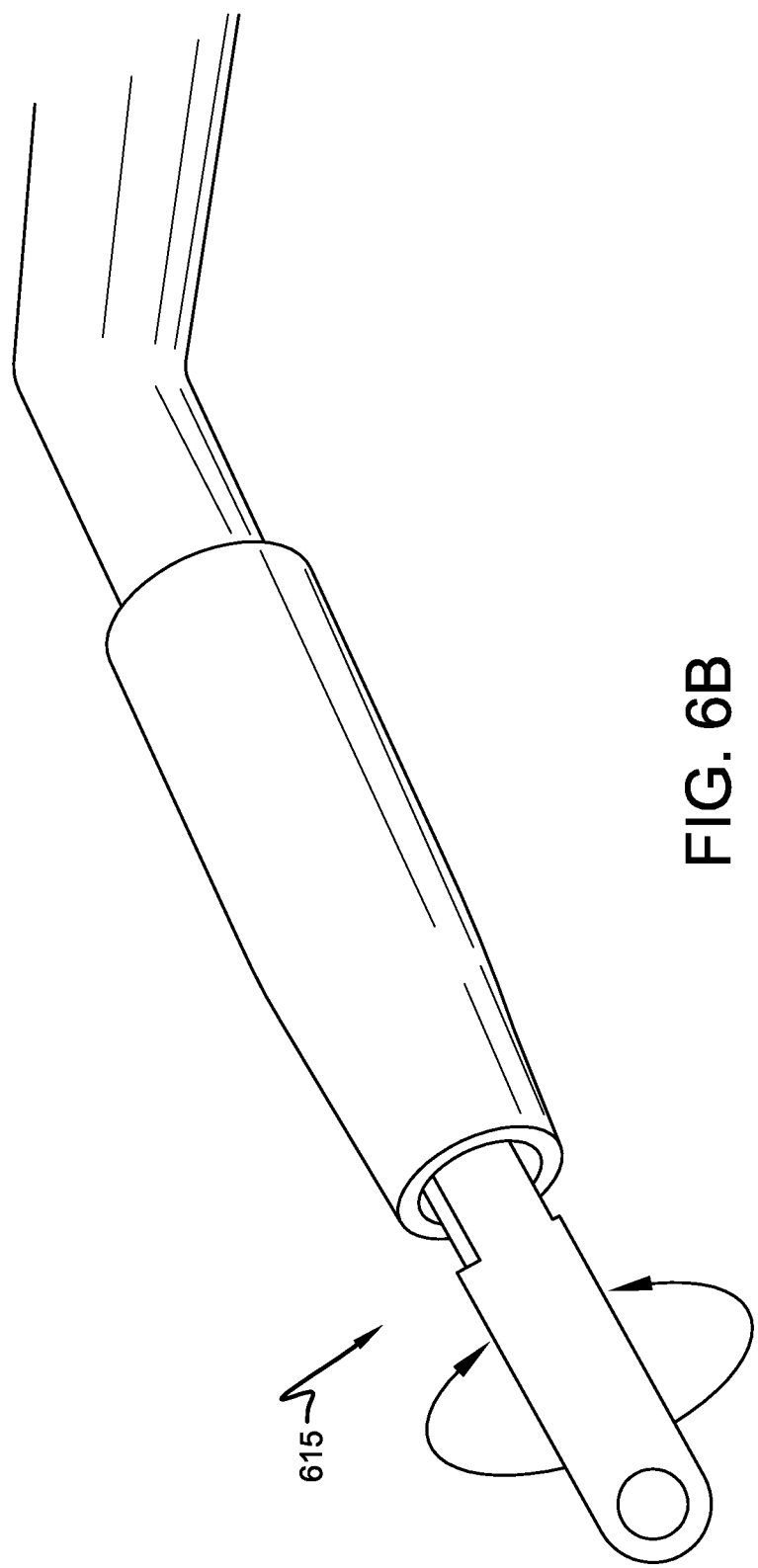
FIG. 6B is a an additional view of a welding nozzle cleaner as pictured in FIG. 6A.

In one example, the thickness gauge 400 also includes at least one rounded corner 408 defined by the edge of the main portion 402. The rounded corner 408 can be formed to a typical weld radius, such as ¼-inch or ½-inch. The thickness gauge 400 is labeled with the length of the radius, as shown in FIG. 6. The rounded corners 408 enable the user to place the thickness gauge 400 in contact with a concave fillet weld and relatively quickly determine the radius of the concave fillet weld.

Figure 5A:
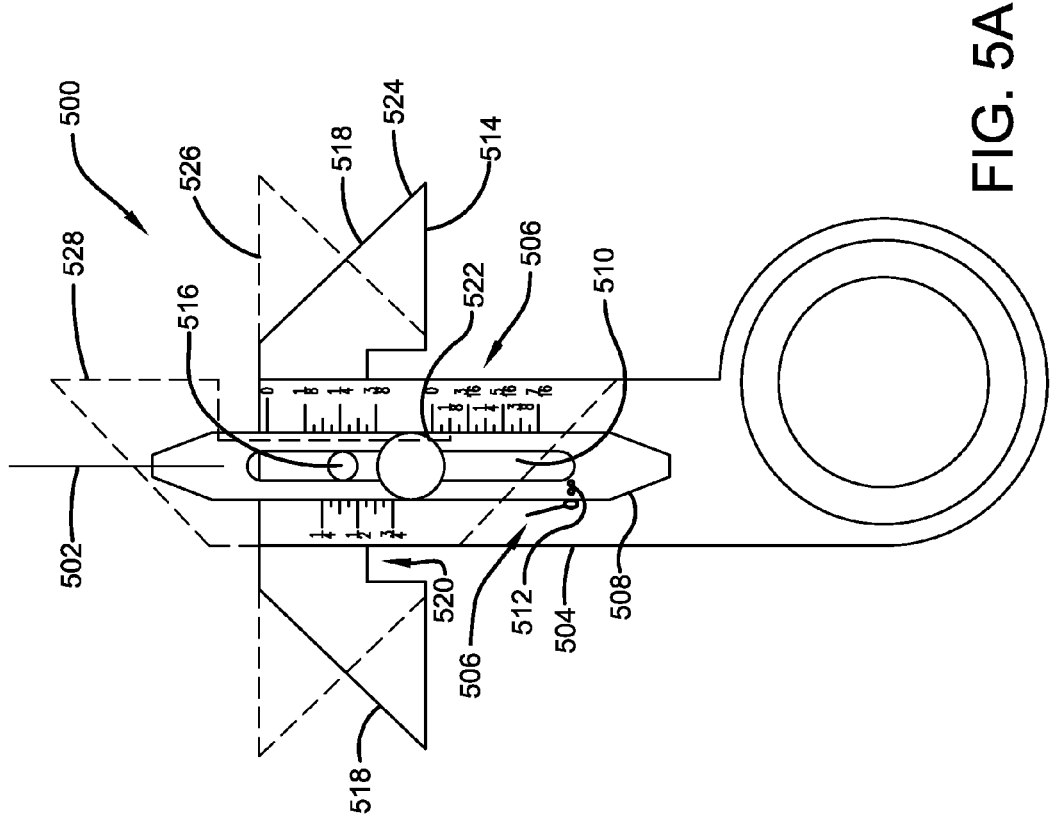
FIGS. 5A, 5B, and 5C illustrate various views of an example fillet gauge which can be included in a pliers welding multi-tool.
Figure 5C:
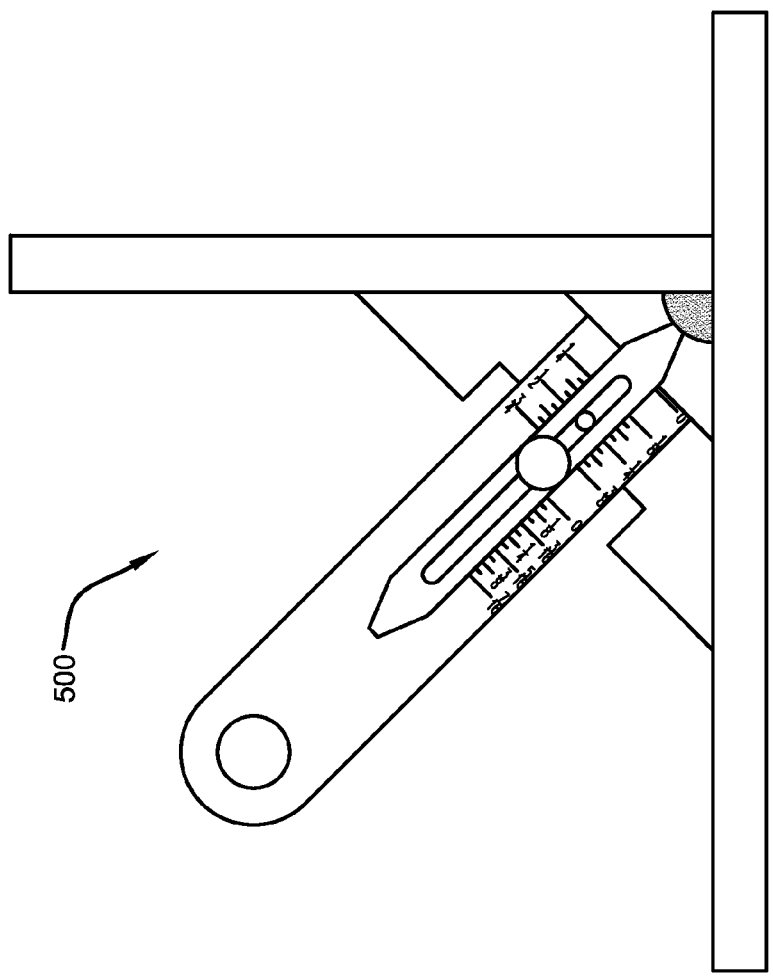
Figure 5B:
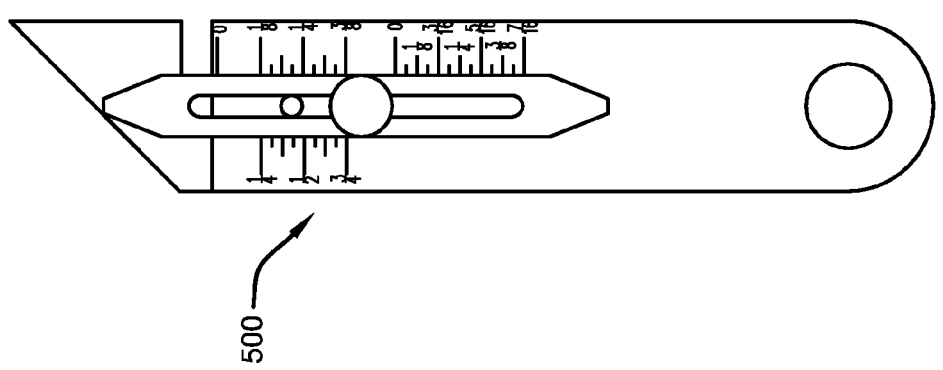

FIG. 5 illustrates a front view of an example fillet gauge 500 which can be included in a pliers welding multi-tool. The fillet gauge 500 includes a central column 504. The central column 504 includes at least one set of graduated measurements 506. In the shown example, the central column 504 includes four sets of graduated measurements 506, two sets on either side of the central column 504. The graduated measurements 506 enable the user to measure various aspects of welds, in particular fillet welds as will be described below.

The fillet gauge 500 also includes a measuring portion 508. The measuring portion 508 is slidingly engaged with the central column 504, and any suitable method of creating the sliding engagement between the measuring portion 508 and the central column 504 can be utilized. In the shown example, the measuring portion 508 has a length dimension that is significantly longer than its width dimension, and each end of the measuring portion 508 is tapered to help facilitate measurement of various aspects of welds. The measuring portion 508 also defines a slot 510. A plurality of indicating marks 512 can be included on the measuring portion 508, each indicating mark 512 corresponding with a set of graduated measurements 506 located on the measuring portion 508.

The fillet gauge 500 further includes a wing portion 514 which is rotatably attached to the central column 504. One example form of attachment of the wing portion 514 to the central column 504 is shown in FIG. 5. One or the other of the wing portion 514 and the central column 504 can include a pin 516. The wing portion 514 is configured to rotate about the pin 516. The shown example wing portion 514 includes two angled surfaces 518 such that the two angled surfaces 518 form an angle having a vertex that intersects with the tool axis 502 of the fillet gauge 500. In one example, the angle formed by the two angled surfaces 518 is a right angle. The wing portion 514 can also define a notch 520.

The fillet gauge 500 further includes a locking portion 522 attached to the central column 504. The locking portion 522 extends through the slot 510 in the measuring portion 508. In one example, the locking portion 522 can be generally cylindrical with a stepped outside diameter. With this configuration, a smaller outside diameter can pass through the slot 510 while a larger diameter at the end of the locking portion 522 that is not attached to the central column 504 cannot. This larger diameter can help maintain the sliding engagement of the measuring portion 508 with the central column 504. Working together with the pin 516, the locking portion 522 can also limit the sliding engagement of the measuring portion 508 with the central column 504 to a linear motion. Additionally, the shown configuration of the pin 516 and the locking portion 522 can also help maintain a parallel arrangement between the measuring portion 508 and the central column 504.

In a further example, the locking portion 522 can be threadingly engaged with the central column 504 such that rotation of the locking portion 522 can effectively clamp the measuring portion 508 between the locking portion 522 larger diameter section and the central column 504. In this way, the measuring portion 508 can be held in place to maintain a particular position showing a particular measurement. Alternatively, the pliers welding multi-tool (e.g., 100, 200) having the measuring portion 508 locked in a desired location can also become a form of a "go/no-go" gauge. In one example of a go/no-go gauge, the measuring portion 508 is clamped in a particular position and the pliers welding multi-tool (e.g., 100, 200) can be slid along a particular weld to see if the weld geometry defines predetermined desired dimensions. Rotation of the locking portion 522 in the opposite direction can then release the measuring portion 508 for further measurements.

The rotatable attachment between the wing portion 514 and the central column 504 enables the wing portion 514 to be placed in several orientations to facilitate several functions. With the wing portion 514 placed in position 524 as shown in solid lines in FIG. 5, the throat of a fillet weld can be measured. To do so, a user places the angled surfaces 518 into contact with the two materials that are welded together. In one example, the two welded materials are positioned to form a right angle. The user then urges the measuring portion 508 into contact with the fillet weld located at the vertex of the two materials. The measurement of the throat of the fillet weld is then read at the location where the indicating mark 512 meets the graduated measurements 506 on the appropriate portion of the central column 504. In this way, the fillet gauge 500 measures the throat of a fillet weld to ensure its structural integrity, as the minimum throat corresponds to the lesser thickness of the two materials welded together.

In another example of weld dimension measurement, the fillet gauge 500 can be used to determine the leg length of the fillet weld. The wing portion 514 is rotated to the position 526 represented by dashed lines in FIG. 5. A corner of the wing portion 514 can be placed at the toe of the fillet weld where it meets one of the welded materials. The measuring portion 508 is then moved into a position where it contacts the other of the welded materials. The measurement of the leg length is then read at the location where the indicating mark 512 meets the graduated measurements 506 on the appropriate portion of the central column 504. Other weld measurements such as concavity and convexity of welds can be measured with the wing portion 514 located in position 526. It is also to be appreciated that the rotatable connection between the wing portion 514 and the central column 504 can enable the fillet gauge 500 to measure asymmetrical welds. Asymmetrical welds can be created as a welder applies a weld bead to one of two materials to be welded together, and then creates multiple weld beads (or passes) to fill in the volume between the first weld bead and the other welded material.

FIG. 5 also shows a third wing portion 514 location in position 528, shown in dashed lines. This position 528 can be used when the fillet gauge 500 is in the home position so that the wing portion 514 and the remainder of the fillet gauge 500 are substantially covered by handle(s) 140/150.

Turning to FIG. 6, additional tools (e.g., groups of tools 146/156) are shown which can also be rotatably attached to a pliers welding multi-tool. The pliers welding multi-tool (e.g., 100, 200) can further include a soap stone 635. The soap stone 635 can be used to mark any number of welded materials, make notes on work pieces, etc. In one example, the soap stone 635 can be fastened into the tool at the base 637 with the use of a clip 636 or other similar structure that can limit the size of an opening in the base 637, effectively pinching the soap stone 635. Individual soap stones can be removed and inserted as required by use and/or wear.

The pliers welding multi-tool (e.g., 100, 200) can also include a welding nozzle cleaner 615. During some types of welding processes, for example metal inert gas (MIG) welding, the MIG welder nozzle can become contaminated with weld spatter. The weld spatter can interfere with the flow of weld wire and the inert gas passed through the nozzle. As such, it is sometimes beneficial to remove the weld spatter with a welding nozzle cleaner. The welding nozzle cleaner 615 enables the user to have a ready cleaning tool that can be inserted into a welding nozzle in order to abrade and/or scrape away the weld spatter that is located within the welding nozzle.

The pliers welding multi-tool (e.g., 100, 200) can further include a scraper 630. The scraper includes a chisel-like end 632 that can be used to remove weld spatter and other undesired contaminants from the surfaces of welded materials and/or the weld. The scraper 630 can also include a file 631. The file can be used for several functions, for example, to abrade undesired weld spatter from a weld, modify the weld dimension, shape a welded material, etc. In another example, the scraper 630 and the file 631 can be separated so that they are included on different tools.

The pliers welding multi-tool (e.g., 100, 200) can also include other tools. In one example, the pliers welding multi-tool (e.g., 100, 200) includes a magnifying glass 605. The magnifying glass can enable the user to inspect fine details of the weld and the weld material. The magnifying glass 605 can be constructed of any number of suitable materials including plastics, glass, et cetera.

Magnifying glass 605 can additionally include bearing 606. Bearing 606 can be provided as a mounting structure, or to improve the rotation, strength, or longevity of one or more tools (e.g., among groups of tools 146/156). While only shown on magnifying glass 605, it is understood that bearing 606, or other similar aspects, can be included on any tool or rotating portion described herein.

The pliers welding multi-tool can also include a tape measure 625. The tape measure 625 can include a wound tape 628 including a hook 627 at an exposed end. The tape measure 625 can be extended, for example up to about two feet, by pulling on the exposed end or hook 627 of the tape 628. The tape 628 can also be spring-loaded or wound about a biased member so that it is automatically retracted into the base 626 after use.

The pliers welding multi-tool can include one or more welding hex drives 665 and/or 670. In welding operations, specifically-sized hex wrenches can be employed in multiple applications such that one or two sizes are required repeatedly for use with several other tools, accessories, or operations. Accordingly, specific welding hex drives 665 or 670 can be included in a pliers welding multi-tool. In an embodiment, welding hex drive 665 is sized to ³⁄₁₆", and welding hex drive 670 is sized to ⁵⁄₆₄", for use with specific MIG welding guns/torches.

A pliers welding multi-tool can also include a combination ruler/saw tool 645. Combination ruler/saw tool 645 includes a graduated straight edge 646 on one side for use as a ruler. Opposite graduated straight edge 646, combination ruler/saw tool 645 can include a saw 647.

Plate and rod gauge 650 is another tool that can be included in a pliers welding multi-tool. A plate and rod gauge 650 includes a V-shaped notch 651 into which a wire, rod, plate, or other portion of material can be inserted to measure its thickness. V-shaped notch 651 includes marked graduations in one or more linear units corresponding with a thickness at a point. For example, a "stick" electrode from a welding gun can be inserted into V-shaped notch 651 to confirm its thickness.

A pliers welding multi-tool can additionally include a root gap gauge 655. Root gap gauge tool 655 is angled to be wider at its base (e.g., closest to pliers welding multi-tool) and includes graduated markings 656 indicative of its width at a particular point. By placing root gap gauge tool 655 into a gap, root gap gauge tool 655 can move into the gap until its edges contact the edges of the gap, stopping its movement. Thus, for example, where a distance is required or desired to be measured between two pieces of metal in a welding operation, root gap gauge tool 655 can be inserted between the metal pieces to determine the distance between such.

Bevel-angle tool 660 can also be included in a pliers welding multi-tool. Bevel-angle tool 660 includes one or more curve gauges 661 that can be used to determine the size of a weld bead or other curved measure according to sized curve gauge(s) 661. In an embodiment, curve gauges 661 can be sized to ¼" and ½" semicircles. Bevel-angle tool 660 can also include one or more angle gauges 662. Angle gauges 662 can be used to determine or confirm an angle. For example, the edges of a pipe can be beveled before welding the pipe. The bevel angle can be quickly confirmed using bevel-angle tool 660.

Of course, other tools can also be included in the pliers welding multi-tool. For example, a knife 610 can be included. Any number of knife configurations can be used. In one example, the knife includes a smooth portion 611 and a serrated portion 612. The pliers welding multi-tool (e.g., 100, 200) can also include a bottle opener 620. In one example, the bottle opener 620 includes an opener portion 622, and can also include a flat head drive 621 to operate slotted screws, pry open containers, and so forth. The pliers welding multi-tool (e.g., 100, 200) can also include a Phillips head drive 640 to operate Phillips head screws. In some embodiments, multiple drives can be included to accommodate different-sized flathead or Phillips head screws. In additional embodiments, other drive heads (e.g., Torx®, spanner, square) can be utilized in substitution of or addition to the tools illustrated.

Further, alternative embodiments of tools can be employed without departing from the scope or spirit of the innovation. For example, welding nozzle cleaner 615' shows an alternative configuration of a welding nozzle cleaner for use with multi-tools herein. In addition, Phillips head drive 640' includes tool removal portion 641 to provide a handle to permit easy access to narrow or difficult-to-grip tools stowed within a recess.

When one tool is removed from its home position for use and the remaining tools stay in their home position, groups of tools 146/156 and respective handles 140/150 permit control and handling of the tool being used. Most of the mass of the pliers welding multi-tool (e.g., 100, 200) remains in handles 140/150 for the user to grip and provide leverage for operating the one tool being used. Additionally, the configuration of the handles 140/150 may enable a better ergonomic fit to the hand. The dimensions of the handles 140/150 provide a substantial volume for the user's clenched first to grip, providing leverage for tool use. In one particular example, the total length of the pliers welding multi-tool (e.g., 100, 200) (e.g., length 102) is 3-inches to 4-inches long. In alternative embodiments, length 102 can be 5 or more inches. In alternative embodiments, width 106 can be approximately 1 to 2 inches, 2 to 3 inches, 3 to 4 inches, or another dimension.

Each of the tools included in the pliers welding multi-tool (e.g., 100, 200) can be formed of suitable materials. However, it is to be appreciated that several of the tools can be formed relatively inexpensively with an initial stamping operation to a selected metal alloy and then finished with particular machining or finishing operations to place the tool in final form for inclusion in the pliers welding multi-tool.

In a further example, the pliers welding multi-tool (e.g., 100, 200) can include a connector 771 as shown in FIGS. 7A and 7B. Connector 771 can be attached to one of handles 140/150 or another portion. Wherever mounted, connector 771 enables the pliers welding multi-tool (e.g., 100, 200) to be retained or attached for access and secure placement. Connector 771 can be a clip, hook, latch, loop, ring, carabiner, or similar retaining or attachment component.

In an embodiment, connector 771 is a magnet that allows pliers welding multi-tool to be placed on a ferrous-containing surface for ease of storage and accessibility. In embodiments where connector 771 is magnetized, connector 771 can also be used to attach the welder pliers welding multi-tool to a work piece which is being welded, so that the pliers welding multi-tool is located out of the way, yet can remain within convenient reach of the user. In another example, various components of the pliers welding multi-tool can be constructed of materials that are permanently magnetized, so that the above described benefits can be present without the need of an additional magnet component, such as connector 771.

Focusing on additional aspects of FIGS. 7A and 7B, illustrated are embodiments of a pliers welding multi-tool 700 (or 700') as viewed from the side in a closed configuration. Pliers nose 710 and pliers base 720 are shown stowed within pliers handle 740 (or 740'), rotated to such position about pliers pin 742. Similarly, group of tools 746 are shown in a stowed configuration within pliers handle 740 (or 740'), rotated to such position about tool pin 741.

Pliers handle 740 (or 740') includes at least side walls 761 and 762. In embodiments, a top wall 763 can be included in pliers handle 740. In embodiments, top wall 763 is at least partially cut-away to facilitate motion of the pliers portion (e.g., rotation about pliers pin 742). In alternative embodiments, pliers handle 740 (or 740') does not include a top wall 763. Further, in embodiments, pliers handle 740 (or 740') includes bottom wall 764 of pliers handle 740 (or 740'). In embodiments, bottom wall 764 is at least partially cut-away to facilitate motion of the group of tools 746. In alternative embodiments, pliers handle 740 (or 740') does not include a bottom wall 764.

Pliers handle 740' can additionally include outer wall 765. Outer wall 765 encloses one side of pliers handle 740' such that a pliers portion and/or group of tools 746 can only be viewed and/or rotate in one direction. While outer wall 765 is shown disposed toward an exterior portion, it is understood that outer wall 765 can be disposed toward an interior portion, allowing tools to rotate outward for use when pliers welding multi-tool 700' is in a closed configuration. In still additional embodiments, outer wall 765 may only extend a portion of the length of handle 740'.

In embodiments such as that of FIG. 7A, where no outer wall 765 is included, one or more tools among group of tools 746 can be rotated entirely around tool pin 741. For example, because no structural member interferes with the rotation of group of tools 746, the tool can be removed by either rotating inward or outward, and can be returned to a stowed condition by either returning it through its initial path of travel, or fully rotating it about tool pin 741 a full 360-degrees to its initial stowed position.

Pliers welding multi-tool 700 is shown with rounded edges 772. In embodiments, the edges of one or more corners or other portions of pliers welding multi-tool 700 can be rounded to prevent snagging, scratching, denting, or injury to the tool, other items, or users. In some embodiments, curved edges can be provided for aesthetic purposes.

While handle 740 (or 740') is shown as a substantially rectangular shape, it will be understood on review of the disclosures herein that the top, bottom, sides, or other portions of handle 740 (or 740') need not be symmetrical, and may be flared, curved, angled, et cetera, in order to better contain or simplify motion of one or more tools among group of tools 646 or a pliers portion, in order to improve ergonomics, in order to appeal to aesthetic preferences, or for other purposes.

Several benefits are realized by the described pliers welding multi-tool. The pliers welding multi-tool provides a number of tools consolidated into one relatively compact tool for use by those associated with welding activities. The pliers welding multi-tool can be conveniently stored and transported while maintaining organization of the individual tools. When the tools are in the stowed or home position, the handle(s) 140/150 serve to protect the tools from harm by impact, abrasion, jostling, etc. that may normally be associated with groups of tools collected in a bag, toolbox, or pocket. The handle(s) 140/150 also protect the user such that the tools are less likely to poke, gouge, scratch, or otherwise negatively affect the user, particularly as the user reaches or gropes for desired tools in a pocket, tool box, et cetera.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. A welding equipment hand tool, comprising:
   a first handle;
   a second handle rotatably coupled to the first handle at a pliers fulcrum;
   a welding pliers including at least two pliers jaws, wherein the welding pliers are opened or closed based at least in part on a position of the second handle in relation to the first handle, and wherein the at least two pliers jaws are configured to stow in a pliers recess of at least one of the first handle and the second handle, and further wherein the welding pliers include at least two pliers arms linking the welding pliers to the first handle and the second handle, and the welding pliers form a welding tip remover located between the pliers jaws and the pliers fulcrum, and the pliers arms form a welding nozzle remover, larger than the welding tip remover, as round recesses in the pliers arms located between the pliers fulcrum and the first and second handles, the welding nozzle remover being larger than the welding tip remover, and wherein the welding tip remover and the welding nozzle remover are opened or closed based at least in part on the position of the second handle in relation to the first handle;
   a welding nozzle cleaner attached to one of the first handle and the second handle, wherein the welding nozzle cleaner is configured to stow in a welding nozzle cleaner recess of at least one of the first handle and the second handle;
   a welding bevel-angle tool attached to one of the first handle and the second handle, wherein the welding bevel-angle tool is configured to stow in a welding bevel-angle tool recess of at least one of the first handle and the second handle; and
   a welding thickness gauge attached to at least one of the first handle and the second handle, wherein the welding thickness gauge is configured to stow in a welding thickness gauge recess of at least one of the first handle and the second handle.

2. The welding equipment hand tool of claim 1, wherein the second handle is configured to collapse against the first handle in a closed configuration.

3. The welding equipment hand tool of claim 1, further comprising a welding wire cutter defined at least in part by a portion of the welding pliers, wherein the welding wire cutter is opened or closed based at least in part on the position of the second handle in relation to the first handle.

4. The welding equipment hand tool of claim 1, further comprising a pliers spring housed at least partially in one or more of the at least two pliers arms, wherein the welding pliers are spring-loaded using the pliers spring.

5. The welding equipment hand tool of claim 1, wherein at least one of the first handle and the second handle are configured to rotate about one or more pliers pins to a closed state, and wherein the welding pliers are surrounded into the pliers recess upon rotation of the at least one of the first handle and the second handle about the one or more pliers pins.

6. The welding equipment hand tool of claim 1, further comprising at least one group of tools attached to one of the first handle and the second handle, wherein the group of tools is configured to stow in a tools recess of at least one of the first handle and the second handle.

7. The welding equipment hand tool of claim 6, wherein one or more of the welding nozzle cleaner, the welding bevel-angle tool, the welding thickness gauge, and the group of tools are rotatably attached to the one of the first handle and the second handle.

8. The welding equipment hand tool of claim 6, wherein the group of tools further includes at least one of a root gap gauge, a plate and rod gauge, a tape measure, and a welding hex drive.

9. A pliers welding multi-tool, comprising:
two handles, wherein each of the two handles comprises at least a pair of sidewalls, wherein a space is defined between the pair of sidewalls;
two pliers pins, wherein one of the two pliers pins is operatively attached to each of the two handles to facilitate rotation of each of the two handles about each axis defined by each of the two pliers pins;
welding pliers operated by motion of the two handles to rotate about a pliers fulcrum, wherein the welding pliers are stowed in or removed from the space by rotating each of the two handles about the axis defined by each of the two pliers pins, wherein the welding pliers include at least two pliers arms linking the welding pliers to the handles, and the welding pliers form a welding tip remover located between pliers jaws and the pliers fulcrum, and the pliers arms form a welding nozzle remover, larger than the welding tip remover, as round recesses in the pliers arms located between the pliers fulcrum and the handles, and wherein the welding tip remover and the welding nozzle remover are opened or closed based at least in part on the position of the handles;
at least one tool pin, wherein the at least one tool pin is operatively attached to one of the two handles; and
a plurality of tools operatively attached to the at least one tool pin, wherein rotation of the plurality of tools into or out of the space is facilitated by movement about an axis defined by the at least one tool pin.

10. The pliers welding multi-tool of claim 9, further comprising a welding nozzle cleaner among the plurality of tools.

11. The pliers welding multi-tool of claim 9, further comprising a welding fillet gauge among the plurality of tools, wherein the welding fillet gauge includes a central column, a measuring portion slidingly engaged with the central column for linear movement along a tool axis of the welding fillet gauge, and a wing portion rotatably attached to the central column, wherein the wing portion includes first and second angled surfaces that together form an angle having a vertex that intersects the tool axis of the welding fillet gauge.

12. The pliers welding multi-tool of claim 9, further comprising a welding thickness gauge among the plurality of tools.

13. The pliers welding multi-tool of claim 9, further comprising a welding wire cutter defined at least in part by a portion of the welding pliers.

14. A welding multi-tool, comprising:
a first pliers handle defining a first pliers recess between a first front face of the pliers handle and a first rear face of the first pliers handle, the first front face of the first pliers handle and the first rear face of the first pliers handle having substantially identical nonlinear planar contours defining at least a first portion of an ergonomic gripping shape;
a second pliers handle mechanically coupled to the first pliers handle, the second pliers handle defining a second pliers recess between a second front face of the second pliers handle and a second rear face of the second pliers handle, the second front face of the second pliers handle and the second rear face of the second pliers handle having substantially identical nonlinear planar contours defining at least a second portion of an ergonomic gripping shape, the first portion of the ergonomic gripping shape and the second portion of the ergonomic gripping shape combine to define a shape easily gripped by a palm during at least movement of the first pliers handle and the second pliers handle with respect to one another;
a welding pliers including a first pliers jaw and a second pliers jaw, the first pliers jaw is rotatably connected to the first pliers handle using a first pliers pin, the second pliers jaw is rotatably connected to the second pliers handle using a second pliers pin, the first pliers pin and the second pliers pin enable the first pliers handle and the second pliers handle to be respectively rotated about the first pliers pin and the second pliers pin such that the welding pliers are encapsulated within one or both of the first pliers recess and the second pliers recess, the first pliers jaw and the second pliers jaw are mechanically coupled at a pliers fulcrum, the welding pliers are opened or closed based at least in part on a position of the second pliers handle in relation to the first pliers handle, and the first pliers jaw and second pliers jaw are configured to stow in at least one of the first pliers recess and the second pliers recess;
a welding torch nozzle remover of the welding pliers formed of a portion of the welding pliers on a first side of the fulcrum, the first side of the fulcrum disposed toward the first pliers handle and the second pliers handle;
a welding torch tip remover of the welding pliers formed of a portion of the welding pliers on a second side of the fulcrum, the second side of the fulcrum disposed toward an end of the first pliers jaw and second pliers jaw distal from the first pliers handle and the second pliers handle;
a first plurality of tools rotatably connected to the first pliers handle using a first tool pin, the first plurality of tools are configured to stow in the first pliers recess;
a second plurality of tools rotatably connected to the second pliers handle using a second tool pin, the second plurality of tools are configured to stow in the second pliers recess;
a welding nozzle cleaner of the first plurality of tools;
a welding fillet gauge bevel-angle tool of the first plurality of tools;
a welding thickness gauge of the first plurality of tools;
a welding nozzle cleaner of the first plurality of tools;
a root gap gauge of the first plurality of tools; and
a plate and rod gauge of the first plurality of tools.

15. The welding equipment hand tool of claim 1, further comprising a welding fillet gauge attached to one of the first handle and the second handle, wherein the welding fillet gauge includes a central column, a measuring portion slidingly engaged with the central column for linear movement along a tool axis of the welding fillet gauge, and a wing portion rotatably attached to the central column, wherein the wing portion includes first and second angled surfaces that together form an angle having a vertex that intersects the tool axis of the welding fillet gauge.

\* \* \* \* \*